US008646723B2

(12) United States Patent
Porte et al.

(10) Patent No.: US 8,646,723 B2
(45) Date of Patent: Feb. 11, 2014

(54) DEVICE FOR CONNECTING AN AIR INLET WITH AN AIRCRAFT NACELLE ACTUATOR ASSEMBLY

(75) Inventors: Alain Porte, Colomiers (FR); Matthieu Fargues, Montauban (FR); Jacques Lalane, Saint Orens de Gameville (FR)

(73) Assignee: Airbus Operations SAS, Toulouse (FR)

( * ) Notice: Subject to any disclaimer, the term of this patent is extended or adjusted under 35 U.S.C. 154(b) by 381 days.

(21) Appl. No.: 13/120,025

(22) PCT Filed: Sep. 17, 2009

(86) PCT No.: PCT/FR2009/051750
§ 371 (c)(1),
(2), (4) Date: Mar. 21, 2011

(87) PCT Pub. No.: WO2010/034922
PCT Pub. Date: Apr. 1, 2010

(65) Prior Publication Data
US 2011/0168839 A1  Jul. 14, 2011

(30) Foreign Application Priority Data
Sep. 23, 2008  (FR) ...................................... 08 56387

(51) Int. Cl.
*B64D 29/00*  (2006.01)
(52) U.S. Cl.
USPC ........................................ 244/53 B; 181/214
(58) Field of Classification Search
USPC ...... 244/1 N, 53 B, 53 R; 60/226.1; 181/213, 181/214; 403/335, 336, 337; 415/119
See application file for complete search history.

(56) References Cited

U.S. PATENT DOCUMENTS

| 4,205,927 | A | * | 6/1980 | Simmons | ...................... 403/337 |
| 4,452,335 | A | * | 6/1984 | Mathews et al. | .............. 181/214 |
| 4,534,167 | A | * | 8/1985 | Chee | ............................. 60/226.1 |
| 5,088,279 | A | * | 2/1992 | MacGee | ..................... 60/226.1 |
| 5,267,828 | A | * | 12/1993 | Lenhart et al. | .................... 415/9 |
| 6,123,170 | A | * | 9/2000 | Porte et al. | .................... 181/214 |
| 6,328,258 | B1 | * | 12/2001 | Porte | ........................... 244/53 B |

(Continued)

FOREIGN PATENT DOCUMENTS

EP    1591643 A1    11/2005

OTHER PUBLICATIONS

International Search Report, dated Jan. 28, 2010, from corresponding PCT application.

*Primary Examiner* — Tien Dinh
*Assistant Examiner* — Michael Kreiner
(74) *Attorney, Agent, or Firm* — Young & Thompson

(57) ABSTRACT

An aircraft nacelle includes an air intake that makes it possible to channel the air in a pipe in the direction of a pipe of a power plant that is arranged in the extension of the pipe, whereby the pipe of the air intake includes at least one panel that integrates an acoustic treatment with an acoustically resistive porous layer that is in contact with the aerodynamic stream that enters into the nacelle, at least one alveolar structure, and a reflective or impermeable layer that forms the rear surface of the panel, a flange that ensures the connection between the air intake and the power plant including at least one wing that is connected to the air intake by a number of connecting elements, characterized in that some of the connecting elements have axes that are secant with the edge of the panel that delimits the pipe of the air intake.

8 Claims, 2 Drawing Sheets

(56) References Cited

U.S. PATENT DOCUMENTS

| | | | |
|---|---|---|---|
| 6,641,326 B2 * | 11/2003 | Schilling et al. | 403/337 |
| 7,121,758 B2 * | 10/2006 | McMillan et al. | 403/408.1 |
| 7,503,425 B2 * | 3/2009 | Strunk | 181/214 |
| 7,793,981 B2 * | 9/2010 | Xie et al. | 280/785 |
| 2004/0255572 A1 * | 12/2004 | Porte | 60/226.1 |
| 2007/0086854 A1 * | 4/2007 | Blanton | 403/338 |
| 2008/0206044 A1 | 8/2008 | Porte et al. | |

* cited by examiner

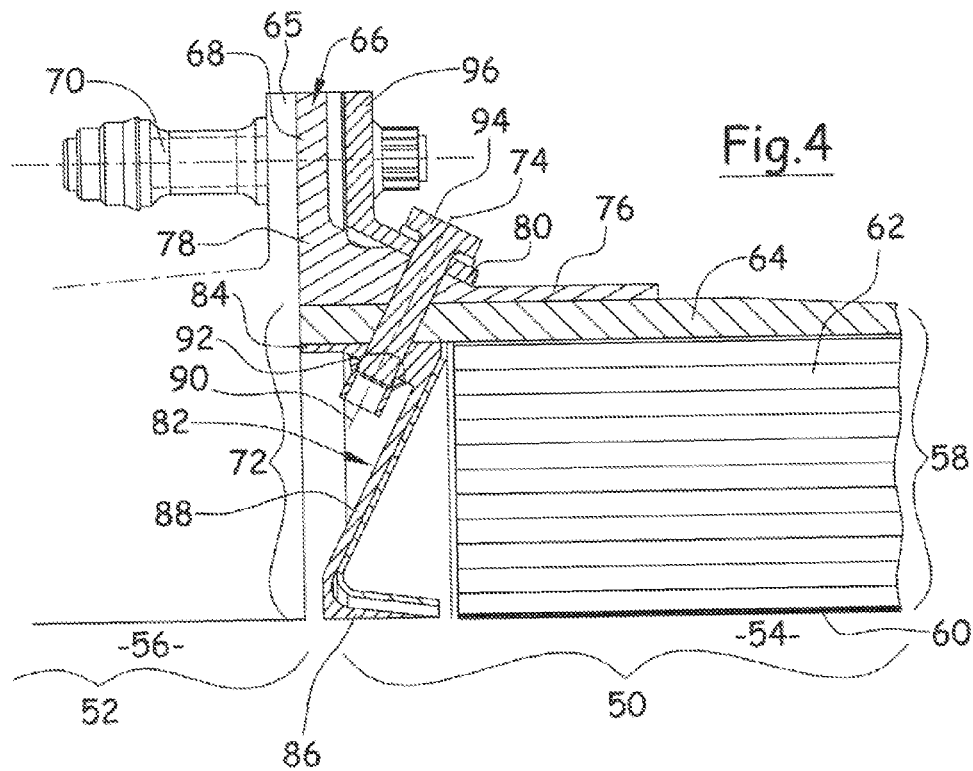
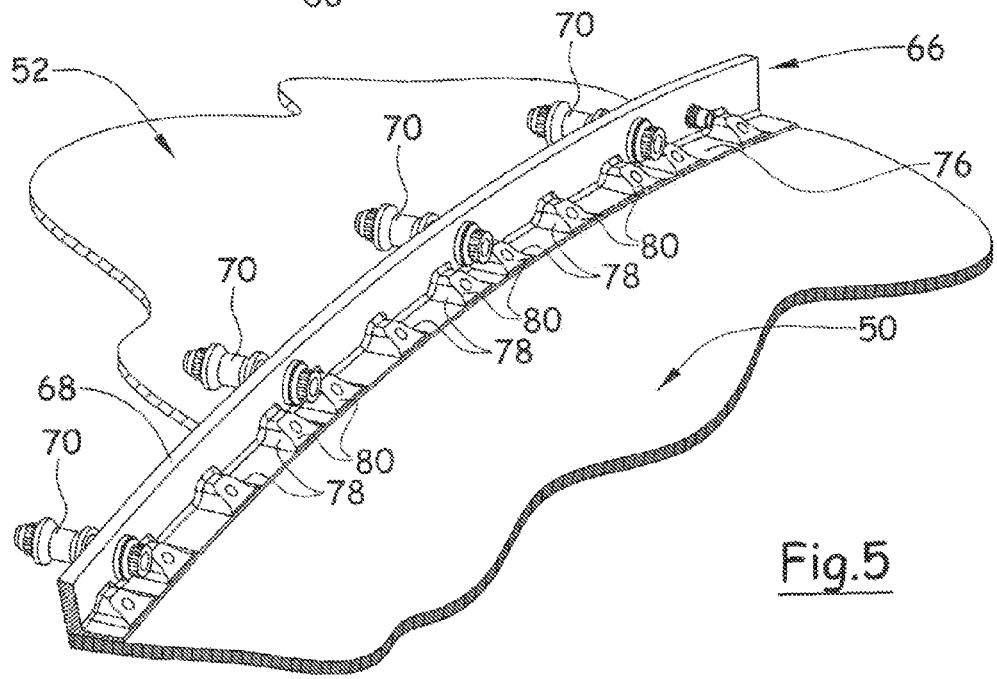

DEVICE FOR CONNECTING AN AIR INLET WITH AN AIRCRAFT NACELLE ACTUATOR ASSEMBLY

BACKGROUND OF THE INVENTION

1. Field of the Invention

This invention relates to a connecting device between an air intake and a power plant of an aircraft nacelle.

2. Description of the Related Art

An aircraft propulsion system comprises a nacelle in which a power plant that is connected by means of a mast to the rest of the aircraft is arranged in an essentially concentric manner.

As illustrated in FIG. 1 the nacelle comprises, at the front, an air intake 10 that makes it possible to channel a stream of air into a power plant 12, a first portion of the incoming stream of air, called a primary stream, passing through the power plant to participate in the combustion, the second portion of the stream of air, called a secondary stream, being entrained by a fan and flowing into an annular pipe that is delimited by the inside wall of the nacelle and the outside wall of the power plant.

The air intake 10 comprises a lip 14 whose surface in contact with the aerodynamic streams is extended inside the nacelle via an inside pipe 16 with essentially circular cross-sections and outside of the nacelle by an outside wall 18 with essentially circular cross-sections.

Techniques have been developed for reducing the noise emitted by an aircraft, and in particular the noise that is emitted by the propulsion systems. They consist in placing—in particular at the wall of the inside pipe 16—a coating 20 whose purpose is to absorb a portion of the sound energy, in particular by using the principle of Helmholtz resonators.

In a known manner, a coating for the acoustic treatment 20, also called an acoustic attenuation panel, comprises—from the outside to the inside—an acoustically resistive porous layer 22 at least one alveolar structure 24 and a reflective or impermeable layer 26.

The acoustically resistive layer is a porous structure that has a dissipative role, partially transforming into heat the acoustic energy of the sound wave that passes through it. It comprises so-called open zones that are able to allow the acoustic waves to pass and other so-called closed or solid zones that do not allow the sound waves to pass but are designed to ensure the mechanical strength of said layer. This acoustically resistive layer is characterized in particular by an open surface area ratio that varies essentially as a function of the engine, components constituting said layer.

The air intake 10 is connected to the power plant 12 by a connection that is illustrated in detail in FIGS. 2 and 3. This connection comprises—at the power plant—an annular collar 28 with which a flange 30 is made integral. This flange has an L-shaped cross-section, of which one wing 32 is flattened against the collar 28 and is made integral with the latter by any suitable means, for example bolts or rivets 34, passing through the collar and the wing 32 of the flange and extending parallel to the longitudinal axis of the nacelle. Preferably, this flange 30 extends over the circumference of the pipe 16 and can be made of several sections. The flange 30 is connected to the air intake 10 and more particularly to the rear surface 36 of the so-called acoustic panel that delimits the inside pipe 16. For this purpose, the second wing 38 of the flange 30 is flattened against the rear surface 36 of the acoustic panel and is made integral with the latter by any suitable means, in particular bolts or rivets 40 that are oriented radially. These blind-type connecting means 40 are deemed less reliable than the conventional attachments. Consequently, the number of connecting means 40 should be significant so that they are distributed in two rows, and it is necessary to provide a structural reinforcement part 42 to ensure the connection between the flange 30 and the acoustic panel that delimits the pipe 16 of the air intake.

The presence of this structural reinforcement part 42 and the arrangement in two rows of the connecting means lead to reducing the treated surface area on the acoustic plane and to not optimizing the acoustic treatment.

SUMMARY OF THE INVENTION

Also, the purpose of this invention is to remedy the drawbacks of the prior art by proposing a connecting device between a power plant and an air intake of an aircraft nacelle that makes it possible to optimize the acoustic treatment.

For this purpose, the invention has as its object an aircraft nacelle that comprises an air intake that makes it possible to channel the air in a pipe in the direction of a pipe of a power plant that is arranged in the extension of said pipe, whereby said pipe of the air intake comprises at least one panel that integrates an acoustic treatment with an acoustically resistive porous layer that is in contact with the aerodynamic stream that enters into the nacelle, at least one alveolar structure, and a reflective or impermeable layer that forms the rear surface of said panel, a flange that ensures the connection between said air intake and said power plant comprising at least one wing that is connected to said air intake by a number of connecting means, characterized in that some of said connecting means have axes that are secant with the edge of said panel that delimits the pipe of the air intake.

BRIEF DESCRIPTION OF THE DRAWINGS

Other characteristics and advantages will emerge from the following description of the invention, a description that is provided only by way of example, relative to the accompanying drawings in which:

FIG. 4 is a cutaway that illustrates in detail a connection between an engine and an air intake of an aircraft nacelle according to the invention, and FIG. 5 is a perspective view that illustrates a portion of a flange that is used for the connection between an engine and an air intake of an aircraft nacelle according to the invention.

DETAILED DESCRIPTION OF THE INVENTION

Figure 1:
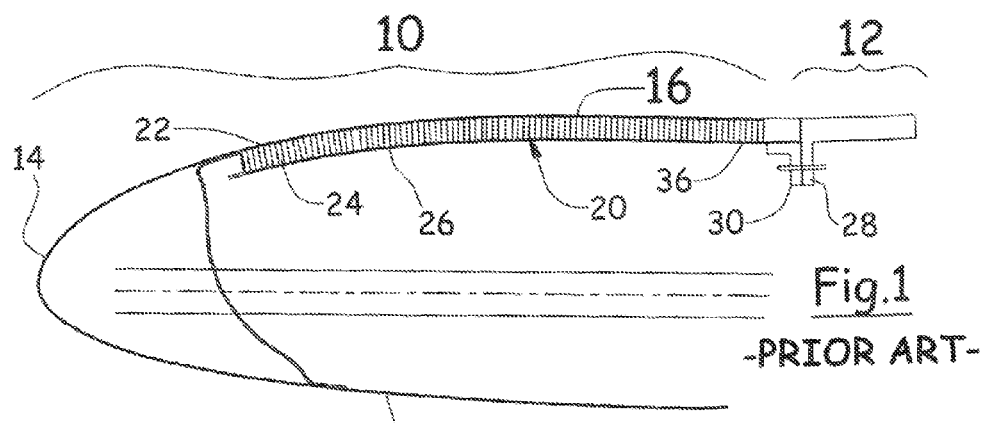
FIG. 1 is a diagrammatic cutaway along a radial plane of a portion of the front of an aircraft nacelle.
Figure 2:
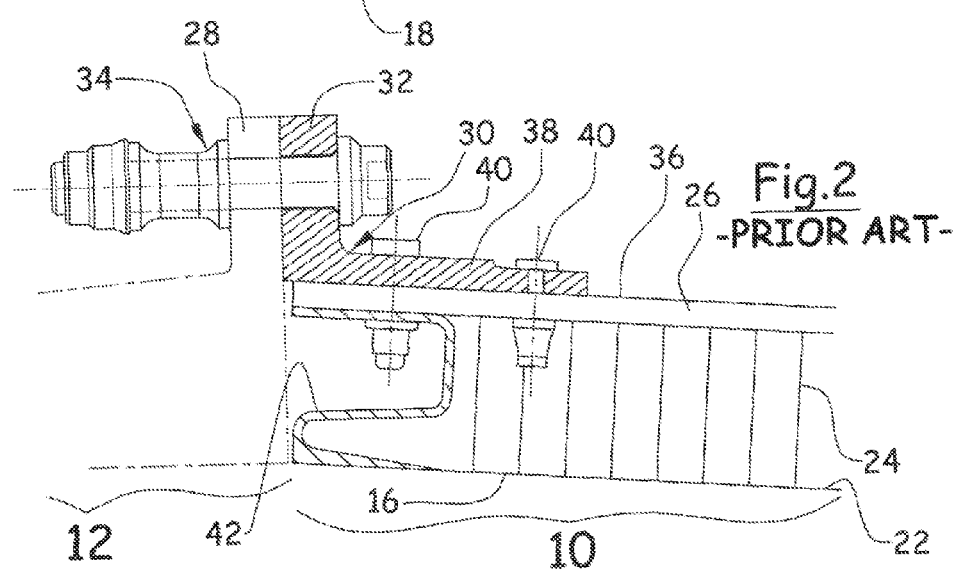
FIG. 2 is a cutaway that illustrates in detail a connection between an engine and an air intake of an aircraft nacelle according to the prior art.
Figure 3:
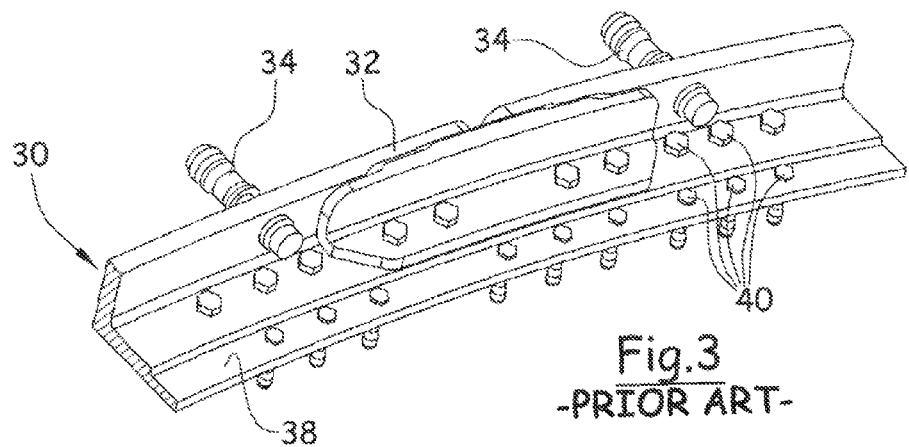
FIG. 3 is a perspective view that illustrates a portion of a flange that is used for the connection between an engine and an air intake of an aircraft nacelle according to the prior art.

In cutaway view. FIG. 4 shows the junction zone between an air intake 50 and a power plant 52 of an aircraft nacelle. In a known manner, the air intake makes it possible to channel the air into a pipe 54 in the direction of a pipe 56 of the power plant that is arranged in the extension of the pipe 54.

The pipe 54 is delimited by at least one panel 58 that integrates an acoustic treatment that comprises an acoustically resistive porous layer 60 that is in contact with the aerodynamic stream that enters into the nacelle, at least one alveolar structure 62, and a reflective or impermeable layer 64 that forms the rear surface of the panel 58.

The air intake 50 is connected to the power plant 52 by a connection according to the invention that is illustrated in detail in FIGS. 4 and 5. At the power plant, this connection comprises an annular collar 65 with which a flange 66 is made integral. This flange has an L-shaped cross-section of which a first wing 68 is flattened against the annular collar 65 and made integral with the latter by any suitable means, for example bolts 70, passing through the annular collar 65 and the wing 68 of the flange and extending parallel to the longitudinal axis of the nacelle that corresponds to the axis of the power plant. Preferably, this flange 66 extends over the circumference of the pipe 54 and can be made of several sections.

The connection between the power plant and the flange is not presented in more detail because other technical solutions could be envisioned.

The air intake 50—and more particularly the panel 58—comprises an edge 72 relative to the power plant in such a way as to ensure a certain continuity between the pipes 54 and 56.

According to the invention, the flange 66 is connected to the air intake 50 by connecting means that comprise a number of rods whose axes 74 are secant with the edge 72 and are therefore not radial. Thus, these connecting means are not of the blind type and are therefore more reliable, which makes it possible to reduce their number and to be able, in some cases, to place them in a single row. In this way, the panel 58 can come close to the power plant, which makes it possible to increase the surface area that is treated on the acoustic plane and therefore to optimize the acoustic treatment.

In addition, the flange comprises a second wing 76 resting against the rear surface 64 of the panel 58 with, for each rod, a projection 78 with an inclined plane 80 forming an angle on the order of 30° with said second wing 76 and perpendicular to the axis 74 of each rod. In addition, from the row of rods of axes 74, the wing 76 can accommodate one or more other blind-type attachment rows for completing the transfer of force into the panel 58 if necessary.

Advantageously, the projections 78 are provided at the junction zone of the wings 68 and 76 and constitute stiffeners in such a way as to limit the unfolding phenomena.

According to an embodiment, each projection 78 has a cross-section in a transverse plane (perpendicular to the longitudinal axis of the nacelle) in the shape of an inverted U, flattened against the second wing 76 that extends from the first wing 68 in the longitudinal direction in the direction toward the front of the nacelle. The portion of each projection 78 that is oriented toward the front of the nacelle is inclined relative to a transverse plane in such a way as to delimit the inclined plane 80. According to this embodiment, the rods that ensure the connection between the flange 66 and the air intake 50 can be arranged close to the wing 68 of the flange, which makes it possible to reduce the dimensions of the second wing 76 and therefore to increase the surface area that is treated on the acoustic plane.

To reinforce the connection between the flange 66 and the air intake 50, the panel 58 comprises—at the edge 72—a structural reinforcement 82 that extends over the circumference of the pipe 54 and that is made in at least one section.

This structural reinforcement 82 is flattened against the reflective layer 64 and placed in the extension of the acoustically resistive porous layer 60 and the alveolar structure 62 This structural reinforcement 82 has, along a radial plane, a Z-shaped cross-section with a first part 84 that is flattened against the reflective layer 64, a second part 86 in contact with the aerodynamic streams that ensure the extension between the pipes 54 and 56, and a third so-called intermediate part 88 that connects the parts 84 and 86 delimiting a release 90 that makes it possible to house a portion of the connecting means between the flange 66 and the air intake 50. The junction zone between the parts 84 and 88 comprises a raised surface with an inclined plane 92 that is parallel to the inclined planes 80 and perpendicular to the axes 74.

According to an embodiment that is illustrated in FIG. 4, the connecting means between the flange 66 and the air intake 50 comprise bolts 94 that comprise a rod of axis 74 with—at a first end—a stop, for example a head resting against the inclined plane 80 and—at a second end—a stop, for example a screw resting against the inclined plane 92, with the two stops being accessible.

When the flange 66 is made of several sections placed end-to-end, means are provided to ensure the connection and the uptake of forces between two successive sections. In this case, a reinforcement angle bar 96 is arranged straddling the two sections to be connected, whereby said reinforcement angle bar is connected to the sections using, on the one hand, connecting means 94 between the flange 66 and the air intake 50, and, on the other hand, connecting means 70 between the flange 66 and the power plant 52.

The invention claimed is:

1. An aircraft nacelle, comprising:
an air intake (50) that includes an air intake pipe (54) located at a front of the nacelle;
a power plant (52) with a fan located within a power plant pipe (56), the power plant (52) being located aft of the air intake (50), the power plant pipe (56) being an aft extension of the air intake pipe (54);
wherein the air intake pipe (54) channels air from the front of the nacelle in an aft direction toward the power plant pipe (56) to channel an incoming stream of air into the power plant pipe (56), a first primary portion of the incoming stream of air passing through the power plant, and a second secondary portion of the incoming stream of air being entrained by the fan and flowing into an annular pipe that is delimited by an inside wall of the power plant pipe (56) and an outside wall of the power plant,
said air intake pipe (54) including i) a panel (58), the panel (58) integrating an acoustic treatment with an acoustically resistive porous layer (60) that is in contact with an aerodynamic stream that enters into the nacelle, at least one alveolar structure (62), and a reflective layer (64), the reflective layer (64) forming a rear surface of said panel (58), and ii) an edge (72) delimiting the air intake pipe (54), the edge (72) being a distal aft portion of the reflective layer (64) located aft adjacent an aft distal end of the alveolar structure (62); and
a flange (66) connecting said air intake (50) and said power plant (52), said flange (66) comprising a first wing (68) connected to a flange of the power plant pipe and a second wing (76), the second wing (76) being connected to the reflective layer (64) forming the rear surface of said air intake (50) by a number of connecting elements, some of said connecting elements connecting the flange (66) to the edge (72) delimiting the air intake pipe (54), said connecting elements connecting the flange (66) to the edge (72) having central longitudinal axes (74) that are secant with the edge;
wherein the flange (66) comprises, at said second wing (76) resting against the rear surface (64) of the panel (58), for each connecting element, a projection (78) with an inclined plane (80) that forms an angle with said second wing (76), and wherein each said connecting element connecting the flange (66) to the edge (72) extends through a corresponding one of said projections (78) so that the longitudinal axis of each said connecting element is perpendicular to the inclined plane;

further comprising, for each connecting element, a structural reinforcement (82) comprising a top (84) having an inclined plane (92), wherein the connecting element is arranged from the projection to the structural reinforcement.

2. The aircraft nacelle according to claim 1, wherein the flange (66) further comprises, at said second wing (76), blind-type connecting elements.

3. The aircraft nacelle according to claim 2, wherein each projection (78) has a cross-section in a transverse plane in the shape of an inverted U, the inverted U shape of each projection (78) being flattened against the second wing (76), each projection (78) extending from the first wing (68) in a longitudinal direction in a direction toward the front of the nacelle, with a portion of each projection (78) that is oriented toward the front of the nacelle being inclined relative to the transverse plane in such a way as to delimit the inclined plane (80).

4. The aircraft nacelle according to claim 1, wherein each projection (78) has a cross-section in a transverse plane in the shape of an inverted U, the inverted U shape of each projection (78) being flattened against the second wing (76), each projection (78) extending from the first wing (68) in a longitudinal direction in a direction toward the front of the nacelle, with a portion of each projection (78) that is oriented toward the front of the nacelle being inclined relative to the transverse plane in such a way as to delimit the inclined plane (80).

5. The aircraft nacelle according to claim 1, wherein the structural reinforcement (82) is positioned at the edge (72) at the distal aft portion of the reflective layer (64), each said connecting element connecting the flange (66) to the edge (72) further extending through said structural reinforcement (82).

6. The aircraft nacelle according to claim 5,
wherein the structural reinforcement (82) is flattened against the reflective layer (64) and located aft an extension of the acoustically resistive porous layer (60) and the alveolar structure (62), and wherein said structural reinforcement (82) has, along a radial plane, a Z-shaped cross-section with a first part (84) that is flattened against the reflective layer (64), a second part (86) that ensures the extension between the air intake and power plant pipes (54, 56), and a third intermediate part (88) that connects said first and second parts (84, 86) delimiting a release (90) housing a portion of the connecting elements between the flange (66) and the air intake (50), wherein each said connecting element connecting the flange (66) extends through said structural reinforcement (82) at said first part (84) that is flattened against the reflective layer (64).

7. The aircraft nacelle according to claim 6, wherein a junction zone between the first part (84) that is in contact with the reflective layer (64) and the intermediate part (88) of the structural reinforcement (82) comprises a raised surface with an inclined plane (92) that is perpendicular to the longitudinal axes (74) of the connecting elements, the connecting elements each extending through said raised surface with the inclined plane (92).

8. The aircraft nacelle according to claim 1, wherein the connecting elements between the flange (66) and the air intake (50) each comprise a rod of longitudinal axis (74) with, at a first end, a stop resting against an inclined plane (80) and, at a second end, a stop resting against an inclined plane (92).

\* \* \* \* \*